US010263289B2

(12) United States Patent
Anandan et al.

(10) Patent No.: US 10,263,289 B2
(45) Date of Patent: Apr. 16, 2019

(54) SOLID STATE BATTERY

(71) Applicant: FORD GLOBAL TECHNOLOGIES, LLC, Dearborn, MI (US)

(72) Inventors: Venkataramani Anandan, Farmington Hills, MI (US); Andrew Robert Drews, Ann Arbor, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 134 days.

(21) Appl. No.: 15/440,098

(22) Filed: Feb. 23, 2017

(65) Prior Publication Data

US 2018/0241089 A1     Aug. 23, 2018

(51) Int. Cl.
| | |
|---|---|
| *H01M 10/0585* | (2010.01) |
| *H01M 10/0562* | (2010.01) |
| *H01M 4/36* | (2006.01) |
| *H01M 4/62* | (2006.01) |
| *H01M 10/052* | (2010.01) |
| *H01M 10/42* | (2006.01) |

(52) U.S. Cl.
CPC ....... *H01M 10/0585* (2013.01); *H01M 4/366* (2013.01); *H01M 4/628* (2013.01); *H01M 10/052* (2013.01); *H01M 10/0562* (2013.01); *H01M 10/4235* (2013.01); *H01M 2300/0077* (2013.01); *H01M 2300/0094* (2013.01)

(58) Field of Classification Search
CPC ......... H01M 10/0585; H01M 10/0562; H01M 2300/0077; H01M 4/0442; H01M 4/0454; H01M 4/0457; H01M 4/0476; H01M 4/0488; H01M 4/0407; H01M 4/0438; H01M 4/0495
See application file for complete search history.

(56) References Cited

U.S. PATENT DOCUMENTS

| | | | |
|---|---|---|---|
| 6,797,428 B1 | 9/2004 | Skotheim et al. | |
| 9,273,399 B2 | 3/2016 | Hellring et al. | |
| 2008/0179743 A1* | 7/2008 | Nakayama | H01L 21/28 257/745 |
| 2011/0027638 A1 | 2/2011 | Deane et al. | |
| 2011/0097623 A1 | 4/2011 | Marinis, Jr. et al. | |
| 2012/0214064 A1* | 8/2012 | Sabi | H01M 4/5825 429/211 |
| 2013/0095381 A1* | 4/2013 | Oukassi | H01M 4/5805 429/209 |

* cited by examiner

*Primary Examiner* — Lisa S Park
(74) *Attorney, Agent, or Firm* — David Kelley; Brooks Kushman P.C.

(57) ABSTRACT

A method of producing a solid state battery includes pre-coating a solid electrolyte surface with a metal to form a sacrificial layer and contacting a metal alloy with the sacrificial layer such that the sacrificial layer and the metal alloy react to form a eutectic liquid metal interface layer, at room temperature and between the electrolyte and a lithium anode, configured to alloy with the liquid metal interface layer at operating potential.

20 Claims, 6 Drawing Sheets

SOLID STATE BATTERY

TECHNICAL FIELD

The present disclosure relates to a solid state battery, a process to make the same, and a method of producing an interface of a solid state battery.

BACKGROUND

Solid state batteries (SSB) include solid electrodes and a solid electrolyte material. In SSBs containing lithium-anode, the lithium (Li) metal anode/solid electrolyte interface routinely suffers from degradation due to mechanical stresses at the interface during the battery cycling process. The degradation is in turn responsible for a non-uniform plating and stripping of the lithium metal, which results in a SSB with lowered performance.

SUMMARY

According to one embodiment, a method of producing a solid state battery is disclosed. The method includes pre-coating a solid electrolyte surface with a metal to form a sacrificial layer. The method further includes contacting a metal alloy with the sacrificial layer such that the sacrificial layer and the metal alloy react to form a eutectic liquid metal interface layer, at room temperature and between the electrolyte and a lithium anode, configured to alloy with the liquid metal interface layer at operating potential. The eutectic liquid metal interface layer may be solid at operating potential. The eutectic liquid metal interface layer may be galinstan or an alloy comprising gallium, tin, and indium. The metal to form the sacrificial layer is one of the elements forming the liquid metal interface layer. The metal alloy may be configured as a layer on a lithium metal anode. The solid electrolyte may include lithium lanthanum zirconium oxide. The sacrificial layer may be about 0.01 µm to 5 µm thick. The eutectic liquid metal interface layer may be a liquid at or near room temperature when the sacrificial layer and the metal alloy are combined.

In an alternative embodiment, a method of wetting an alloy on a solid electrolyte is disclosed. The method includes depositing a first solid metal or metal alloy onto a solid electrolyte surface or a lithium metal anode. The method also includes contacting the first metal or metal alloy with a second solid metal or metal alloy such that the first solid metal or metal alloy and the second solid metal or metal alloy react to form a eutectic liquid metal interface layer, at room temperature. The eutectic liquid metal interface layer is arranged between the electrolyte and the lithium anode. The lithium anode is configured to alloy with the eutectic liquid metal interface layer at operating potential. The first solid metal or metal alloy includes at least one element of the eutectic liquid metal interface layer. The first metal alloy may be configured as a top layer of the solid electrolyte surface. The second metal alloy may be configured as a top layer of the solid electrolyte surface. The first and second metal alloys may be both deposited onto the solid electrolyte surface. The solid electrolyte may include lithium lanthanum zirconium oxide.

In a yet another embodiment, a method of forming a solid state battery is disclosed. The method includes pre-coating a surface on a solid electrolyte, attached to a lithium-containing cathode, with a first metal or metal alloy to form a sacrificial layer. The method may also include depositing a second metal or metal alloy onto an anode or anode current collector. The method may include contacting the second metal or metal alloy with the sacrificial layer such that the sacrificial layer and the second metal or metal alloy react to form a eutectic liquid metal interface layer, at room temperature. The eutectic liquid metal interface layer is arranged between the solid electrolyte and the anode or anode current collector. The method may further include de-lithiating the cathode by supplying operating potential to the battery such that lithium ions deposit on the eutectic liquid metal layer-anode interface or the eutectic liquid metal layer-anode current collector interface. The method may further include forming a lithium metal layer between the eutectic liquid metal interface layer and the anode current collector. The eutectic liquid metal interface layer may alloy with lithium at operating potential. The eutectic liquid metal interface layer may be liquid at operating potential. The first and second metal or metal alloys have different chemical composition. The first and second metal or metal alloys are solid at room temperature and liquefy on contact with each other.

DETAILED DESCRIPTION

Reference will now be made in detail to compositions, embodiments, and methods of the present invention known to the inventors. However, it should be understood that disclosed embodiments are merely exemplary of the present invention which may be embodied in various and alternative forms. Therefore, specific details disclosed herein are not to be interpreted as limiting, rather merely as representative bases for teaching one skilled in the art to variously employ the present invention.

Except where expressly indicated, all numerical quantities in this description indicating amounts of material or conditions of reaction and/or use are to be understood as modified by the word "about" in describing the broadest scope of the present invention.

The description of a group or class of materials as suitable for a given purpose in connection with one or more embodiments of the present invention implies that mixtures of any two or more of the members of the group or class are suitable. Description of constituents in chemical terms refers to the constituents at the time of addition to any combination specified in the description, and does not necessarily preclude chemical interactions among constituents of the mixture once mixed. The first definition of an acronym or other abbreviation applies to all subsequent uses herein of the same abbreviation and applies mutatis mutandis to normal grammatical variations of the initially defined abbreviation. Unless expressly stated to the contrary, measurement of a property is determined by the same technique as previously or later referenced for the same property.

SSBs have both solid electrodes and solid electrolyte. The solid state battery cells are typically based on ceramic electrolytes which are a promising alternative to flammable and unstable liquid electrolytes for batteries. In addition, SSBs offer significant improvement in volumetric energy density and safety over conventional lithium-ion batteries. But the implementation of current solid electrolyte-based batteries is challenging due to the limited conductivity of solid electrolytes and several competing factors such as a need for a low cell resistance and good mechanical robustness. In addition, one of the major technical challenges in developing SSBs is the poor stability of lithium metal anode/solid electrolyte interface.

Although low resistance is observed with lithium/solid electrolyte interface in an as-fabricated or newly fabricated SSB, the resistance increases significantly with cycle life. The increased resistance causes degradation in the rate capability and capacity of the SSB. This issue exists mainly as the result of mechanical stresses at the interface as well as due to non-uniform plating and stripping of lithium metal, which occurs during the cycling process. These factors lead to a poor contact between the solid electrolyte and the lithium metal anode, causing increase in the resistance.

Figure 1A:
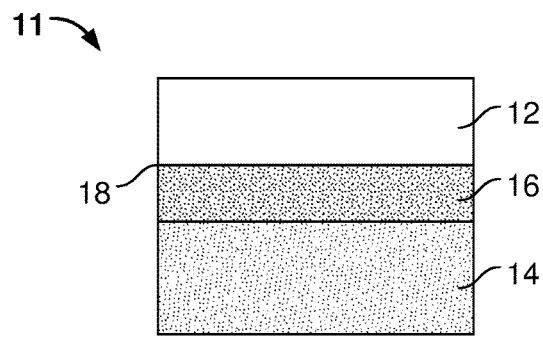
FIG. 1A schematically depicts a side view of a prior art as-assembled SSB prior to a first charge.
Figure 1B:
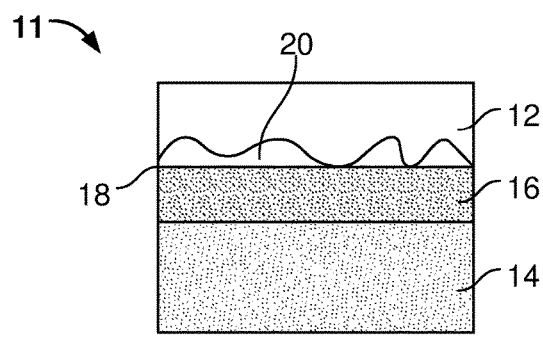
FIG. 1B depicts the SSB of FIG. 1 after a number of cycles.

FIGS. 1A and 1B schematically depict the same prior art SSB 10 including an anode 12, a cathode 14, an electrolyte 16, and an interface 18 between the anode 12 and the electrolyte 16. The SSB in FIG. 1A is in its as-assembled or newly fabricated state prior to a first charge. In FIG. 1B, the same SSB 11 is schematically depicted after a number of cycles. As can be seen in FIG. 1B, the interface 18 is delaminated such that the anode 12 and the electrolyte 16 lack sufficient contact and gaps 20 are formed between the anode 12 and the electrolyte surface 16.

Thus, a need for increased adhesion or wettability of the anode/solid electrolyte interface in SSBs exists. Low temperature eutectic materials of gallium (Ga) such as galistan (GaInSn) or gallium-indium (GaIn) are liquid materials at room temperature, and are therefore attractive candidates for use as an intermediate liquid layer for the Li-metal/solid electrolyte interface in SSBs. But these materials can wet only some material surfaces in ambient air, and these materials do not generally wet the same surfaces under an inert atmosphere. Without limiting the disclosure to a single theory, it is presumed that gallium reacts with oxygen in the air, forming an oxide shell, which in turn aids wetting. In the absence of oxygen in the inert atmosphere, the reaction aiding wetting does not take place. An alternative explanation lies in the presumption that the solid electrolyte surface becomes partially hydrated in the air and the attached hydroxyl species interact with the metal alloys to allow wetting. Regardless of the reason behind the described phenomenon, a method capable of increased wetting of the Li-metal/solid electrolyte interface in SSBs in a dry inert atmosphere is needed since any SSB incorporating Li metal has to be assembled under dry inert conditions. Thus, to make a liquid metal surface practical, a method to wet the solid electrolyte surface in a dry inert atmosphere has to be identified.

Figure 2A:
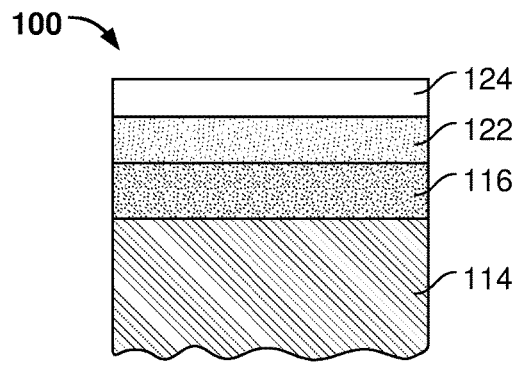
FIGS. 2A-2C schematically depict side views of an example SSB in different stages of formation of the SSB according to one or more embodiments.
Figure 2B:
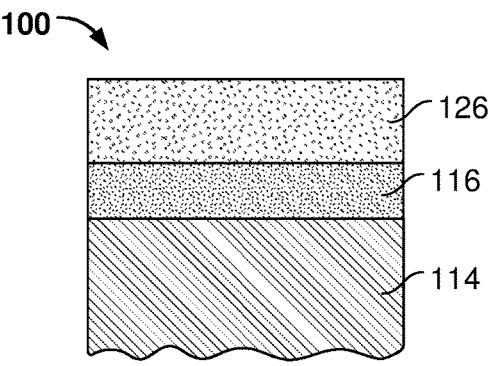

In one or more embodiments, a solution to address the above-mentioned problems includes adding an interface layer composed of a metal or metal alloy, forming a sacrificial layer 122 between the anode 112 and the electrolyte 116. The sacrificial layer 122 is schematically depicted in FIG. 2A. The sacrificial layer 122 reacts with a metal alloy 124, upon exposure to the metal alloy 124, to from a eutectic liquid metal interface layer 126, which is schematically depicted in FIG. 2B. The sacrificial layer 122 reacts with the metal alloy 124 independent of operating potential. Upon contact, both the sacrificial layer 122 and the metal alloy 124 react and form the eutectic liquid metal interface layer 126.

Figure 2C:
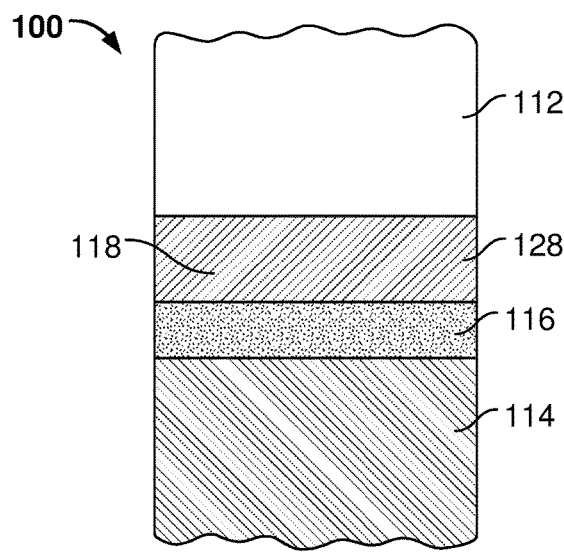

The eutectic liquid metal interface layer 126 is liquid at room temperature and may form an alloy 128, depicted in FIG. 2C, with lithium ions at an operating potential of the battery 100. At certain charging potential, lithium ions may alloy with the eutectic liquid metal interface layer 126 and form a solid alloy 128. When the potential is reversed such as during discharge, lithium ions may be extracted from the solid alloy 128, which may lead to the formation of a liquid interface.

The alloy 128 may improve and maintain contact area between the anode surface 112 and the electrolyte surface 116 over many battery cycles. The number of battery cycles may be 1 to several thousand. Each battery cycle includes charging and discharging.

The lithium ions may be supplied from the anode 112, the cathode 144, or an alternative source of lithium (not depicted) provided with the battery 100. The alternative source may be a temporary or permanent part of the battery 100. The alternative source may serve to provide lithium only during the first charge. The alternative source may not form an integral part of the battery 100.

In at least one embodiment, a method includes preparing a surface of a solid electrolyte 116 to enable or promote wetting between the solid electrolyte surface 116 and the anode 112. The method utilizes a sacrificial layer 122, a metal alloy layer 124, combined to form a eutectic liquid metal interface layer 126, to achieve the improved wettability of the solid electrolyte surface 116. The wetting may be achieved by depositing the sacrificial layer 122 directly onto the solid electrolyte surface 116. The solid electrolyte surface 116 may be thus pre-coated with the sacrificial layer 122 which further reacts with a metal alloy layer 124 to form a eutectic liquid metal interface layer 126.

While the method described herein utilizes pre-coating of an electrolyte surface 116, the method is likewise applicable if the sacrificial layer 122 is first deposited onto a surface of the anode 112 or an anode current collector.

The SSB 100 of the present disclosure may include a variety of materials. For example, the SSB may be a solid state lithium-ion battery. The type of SSB materials may be selected according to demands of a specific application. The SSB may include materials such as $Ag_4RbI_5$ for $Ag^+$ conduction, various oxide-based electrolytes such as lithium lanthanum zirconium oxide (LLZO), lithium phosporhus oxynitride (LiPON), LATP, LISICON, Thio-LISICON, etc. and sulfide-based electrolytes such as $Li_{10}GeP_2S_{12}$, $Li_2S$—$P_2S_5$, etc. for $Li^+$ conduction, a clay and β-alumina group of compounds ($NaAl_{11}O_{17}$) for $Na^+$ conduction and other mono- and divalent ions. The SSB's cathode, anode, or both may be free of lithium (Li) ions at least at one point of formation of the SSB, while the SSB is in its as-assembled state, or during operation of the SSB.

The sacrificial layer 122 may be a coating capable of wetting the surface of the solid electrolyte 116 under deposition conditions. The sacrificial layer 122 is solid at or near room temperature. Room temperature, as referenced herein, is a temperature between about 18° C. (64° F.) and 25° C. (77° F.). The sacrificial layer 122 may be a metal coating. The deposition conditions may vary. For example, the deposition conditions may include an inert atmosphere of Ar, $N_2$, $He_2$, $H_2$, or the like. An inert atmosphere relates to a gaseous mixture that contains little or no oxygen and primarily consists of non-reactive gases. The deposition conditions may include dry air with relative humidity being less than 50, 40, 30, 20, 10, 5, 2, 1%. The pre-coating material forming the sacrificial layer 122 may be any material included in the eutectic liquid metal interface layer 126.

The sacrificial layer 122, the metal layer 124, as well as other layers described herein may be deposited using a variety of processes such as, for example, physical vapor deposition, wet chemical deposition, coating, dipping, or the like. The thickness of the sacrificial layer 122, the metal alloy layer 124, or both may be about 0.01 to 5 µm, 0.5 to 4 µm, or 1 to 3 µm.

The sacrificial layer 122 may include a metal or a metal alloy. For example, the sacrificial layer 122 may include tin, gallium, indium, or a combination thereof. The composition of the sacrificial layer 122 forms a subpart of the later-formed eutectic liquid metal interface layer 126 that is liquid at or near room temperature. The composition of the metal alloy 124 may be chosen to be another subpart of the same eutectic liquid metal interface layer 126 such that the combination of the two layers 122, 124 taken together forms the composition of the eutectic liquid metal interface layer 126. For example, the eutectic liquid metal interface layer 126 may be galinstan, an alloy of gallium, indium, and tin that is liquid at room temperature. In one non-limiting example, the sacrificial layer 122 may thus include gallium and the metal alloy 124 may include an alloy of tin and indium. In another embodiment, the sacrificial layer 122 may include indium and the metal alloy 124 may include an alloy of gallium and tin. In a yet another embodiment, the sacrificial layer 122 may include tin and the metal alloy 124 may include an alloy of indium and gallium. Alternatively, the composition of the above-named embodiments may be reversed between the layers 122 and 124 such that the sacrificial layer 122 includes an alloy and the layer 124 includes a single metal.

The composition of the subparts 122, 124 of the eutectic liquid metal interface layer 126 may be such that each subpart 122, 124 is solid at room temperature. The sacrificial layer 122 may include any element of the liquid metal interface layer 126 as long as at least one of the elements of the interface layer 126 composition is absent such that the deposited sacrificial layer 122 is solid at room temperature. The same applies to the metal alloy overcoat layer 124. On contact, the separate components of the eutectic liquid metal interface layer 126 react to form the eutectic liquid metal interface layer 126. In a yet another embodiment, the number of subparts may be greater than two layers 122, 124. For example, since the eutectic liquid metal interface layer 126 may be galinstan, three separate layers may be applied onto the electrolyte, the anode, or the anode current collector, as is discussed further below. The first discreet layer thus includes gallium, the second discreet layer includes indium, and the third discreet layer includes tin.

The metal or metal alloy 124 is solid at or near room temperature. The metal alloy 124 may form an overcoat layer. The metal or metal alloy 124 may overcoat the sacrificial layer 122, the first layer, the second layer, the anode, or the anode current collector. The metal alloy 124 may be deposited onto the sacrificial layer 122 before a lithium metal anode is placed in contact with the liquid metal interface layer 126.

Alternatively, the metal alloy 124 may be deposited as a layer on the anode 112 while the sacrificial layer 122 is deposited on the solid electrolyte 116. The sacrificial layer 122 and the metal alloy 124 may thus be kept separate until they are contacted to form the eutectic liquid metal interface layer 126.

The sacrificial layer 122 and the metal alloy layer 124, when considered together, have a composition that is the composition of the eutectic liquid metal 126. Thus, the composition of the sacrificial layer 122 and the metal alloy 124 is interchangeable. Just like the sacrificial layer 122, the metal alloy 124 may include a gallium alloy such as galinstan or an alloy of gallium and indium and/or tin. The ratio of gallium:another element(s) may be about 0.5:1, 1:1, 1:1.5, 1:2, 1:3, 1:4, 1:5, 1:6, 1:7, 1:8, 1:9, or 1:10. The metal alloy 124 is solid at or near room temperature. The metal alloy 124 readily reacts with the sacrificial layer 122 upon contact and forms the eutectic liquid metal interface layer 126.

The eutectic liquid metal interface layer 126 is formed by combining the sacrificial layer 122 with the metal alloy 124 or by combining any amount of layers which, when contacted together, form the eutectic liquid metal interface layer 126. The eutectic liquid metal interface layer 126 is located at the surface of the solid electrolyte 116 and forms an interface layer between the solid electrolyte 116 and an anode, such as a lithium metal anode or between the solid electrolyte 116 and a lithium metal layer formed by de-lithiating a lithium-containing cathode.

The eutectic liquid metal interface layer 126 may exist only temporarily. The eutectic liquid metal interface layer 126 may exist while the SSB 10, 100 is in its as-assembled or manufactured state before the SSB's first charge. The eutectic liquid metal interface layer 126 may react with lithium ions. Upon reaction with lithium ions, the eutectic liquid metal interface layer 126 may form an alloy 128 with the lithium ions, as was discussed above. The formation of the layer 126, or alloying of the eutectic liquid metal interface layer 126 with the lithium ions, occurs in response to supplying an operating potential to the SSB 10, 100. For example, during the first charge of the SSB 10, 100, the operating potential prompts movement of the lithium ions within the SSB 10, 100 in such a way that the lithium ions react with the eutectic liquid metal interface layer 126 to form the alloy 128.

The eutectic liquid metal interface layer 126 is a liquid at or near temperature and may be a liquid or a solid at operating potential. As is explained below, the eutectic liquid metal interface layer 126 may remain a liquid, without alloying with lithium ions, during the operating potential if the anode or anode current collector used has a higher lithium alloying potential or higher lithium intercalation potential than the alloying potential of the eutectic liquid metal interface layer 126. The eutectic liquid metal interface layer 126 may become solid at operating potential if the applied potential is lower than the alloying potential of the eutectic liquid metal interface layer 126 and lithium.

The eutectic liquid metal interface layer-lithium ions alloy 128 may be solid at operating potential. The alloy or lithium-liquid metal layer 128 has an increased adhesion to the electrolyte surface 116 and the anode surface 112 or lithium metal layer surface, resulting in a more stable interface 118 between the electrolyte 116 and the anode 112 or the electrolyte and the lithium metal layer surface when compared to the prior art equivalent interfaces.

Under certain circumstances, such as during battery discharge, the alloy 128 may de-alloy into the Li-free eutectic liquid metal interface layer 126. This may be the case, for example, when the lithium ions contacting the eutectic liquid metal interface layer 126 are not provided from a layer immediately adjacent to the layer 126.

Figure 3A:
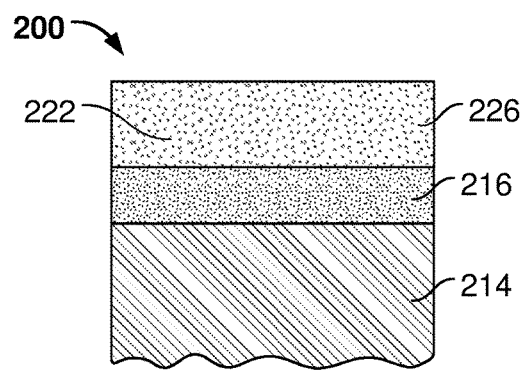
FIGS. 3A and 3B schematically depict side views of an alternative SSB in different stages of formation of the SSB according to one or more embodiments.
Figure 3B:
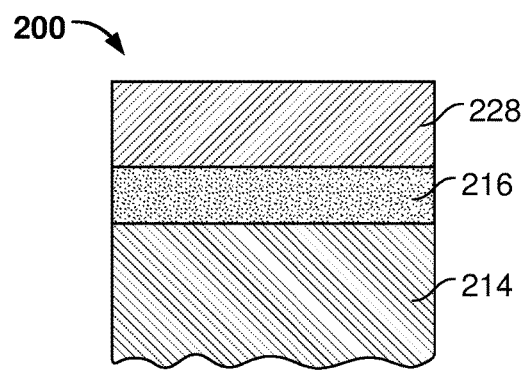

In one or more embodiments, depicted schematically in FIGS. 3A and 3B, the SSB 200 includes a eutectic liquid metal layer 226 which forms the battery anode 222. The SSB 200 includes lithium ions in its cathodic material 214. Alternatively, the lithium ions may come from a separate source, as was described above. In response to supplying an operating (charging) potential to the SSB 200, the eutectic liquid metal layer 226 alloys with lithium ions to form a lithium-liquid metal layer 228. In this embodiment, de-alloying of the lithium-liquid metal layer 228 may occur in response to reversing the operating potential to the SSB 200.

Figure 4A:
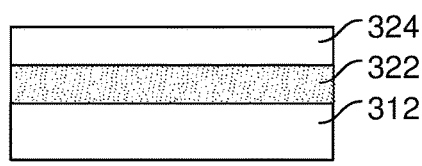
FIGS. 4A and 4B schematically illustrate different stages of wetting a substrate according to one or more embodiments.
Figure 4B:
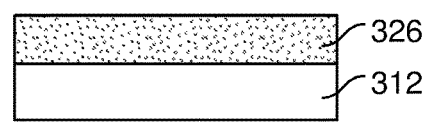

The wetting method described herein is generally applicable to wetting of a gallium-based alloy on any substrate under dry and/or inert atmosphere, as described above, as is schematically depicted in FIGS. 4A and 4B. The example substrate layer 312 may include a solid or gel electrolyte as described above. Alternatively, the example substrate layer 312 may be a battery anode current collector which may be used, for example, as an anode in a conventional Li-ion battery. Other substrates are contemplated. For example, the method may be used to coat substrates in microelectromechanical systems (MEMs) and electronic devices. The method includes pre-coating the substrate 312 with a metal or metal alloy to form a sacrificial layer 322, as described above. The method further includes depositing a gallium-alloy 324 onto the sacrificial layer 322 such that the sacrificial layer 322 and the gallium-alloy 324 react to form a eutectic liquid metal surface 326. The eutectic liquid metal surface 326 may further form an alloy with lithium ions as was described with respect to different embodiments above.

Figure 5:
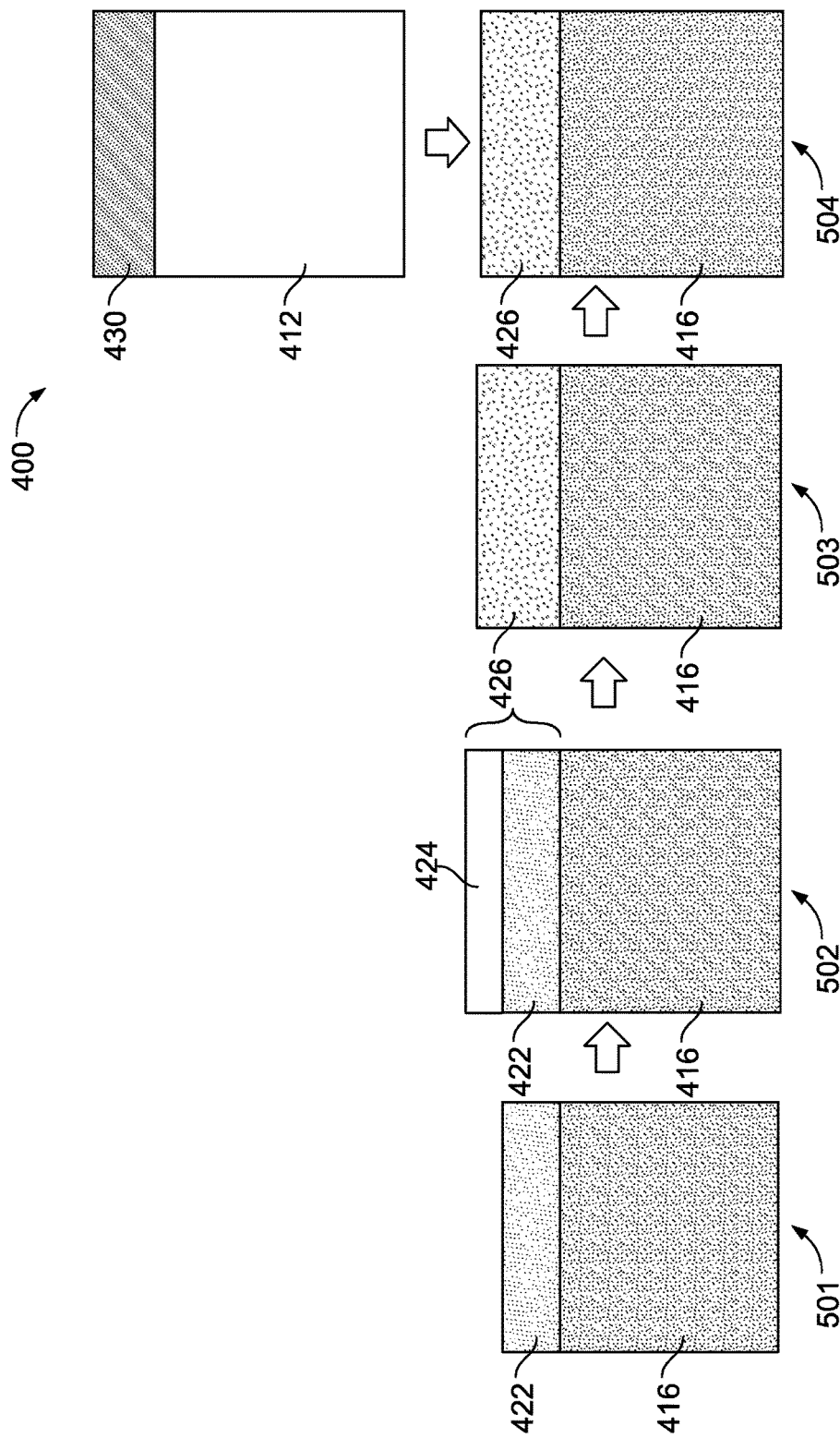
FIGS. 5-8 schematically illustrate series of method steps to produce a solid state battery.

With respect to FIG. 5, a method of forming a solid state battery 400 is depicted. At step 501, a sacrificial layer 422 is deposited onto the solid electrolyte 416. At step 502, an overcoat layer of a metal or metal alloy 424 is deposited onto the sacrificial layer 422. At step 503, the sacrificial layer 422 and the metal alloy 424 react on contact, at room temperature, and form a eutectic liquid metal interface layer 426. At step 504, a lithium metal anode 412 with an anode current collector 430 is applied onto the eutectic liquid metal interface layer 426. A cathode with a cathode current collector (not depicted) are also provided and attached to the solid electrolyte 416. Upon supplying an operating potential or electric current to the battery 400, the eutectic liquid metal interface layer 426 reacts with the lithium metal anode 412 and forms an alloy or lithium-liquid metal layer (not depicted).

Figure 6:
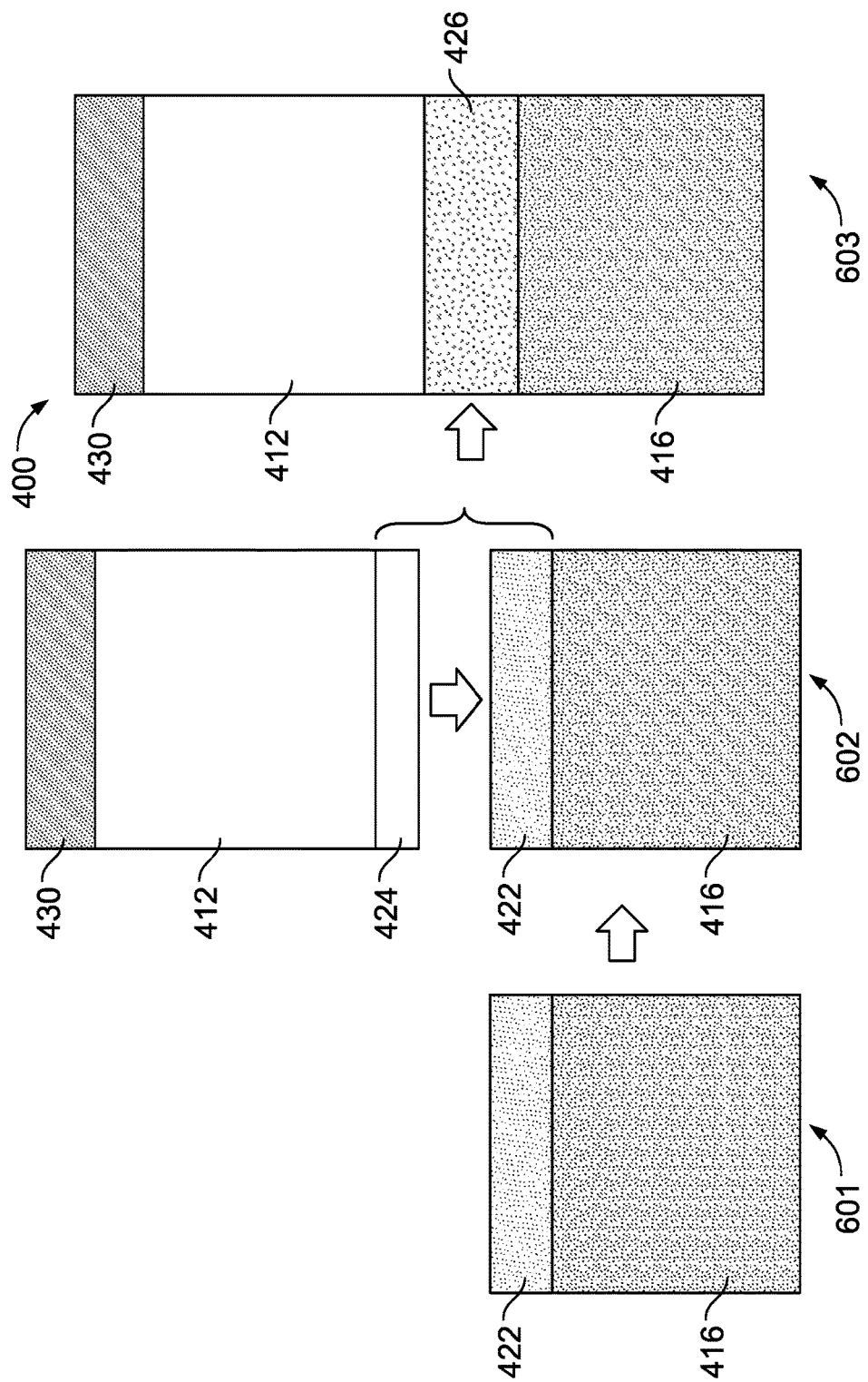

In an embodiment depicted in FIG. 6, an alternative method of forming a solid state battery 400 is disclosed. At step 601, a sacrificial layer 422 is deposited onto the solid electrolyte 416. At step 602, a metal or metal alloy 424 is deposited onto the lithium metal anode 412 instead of on to the sacrificial layer 422, as in the embodiment depicted in FIG. 5. The sacrificial layer 422 and the metal alloy are contacted. On contact, at step 603, the sacrificial layer 422 and the metal alloy 424 react and form a eutectic liquid metal interface layer 426.

Figure 7:
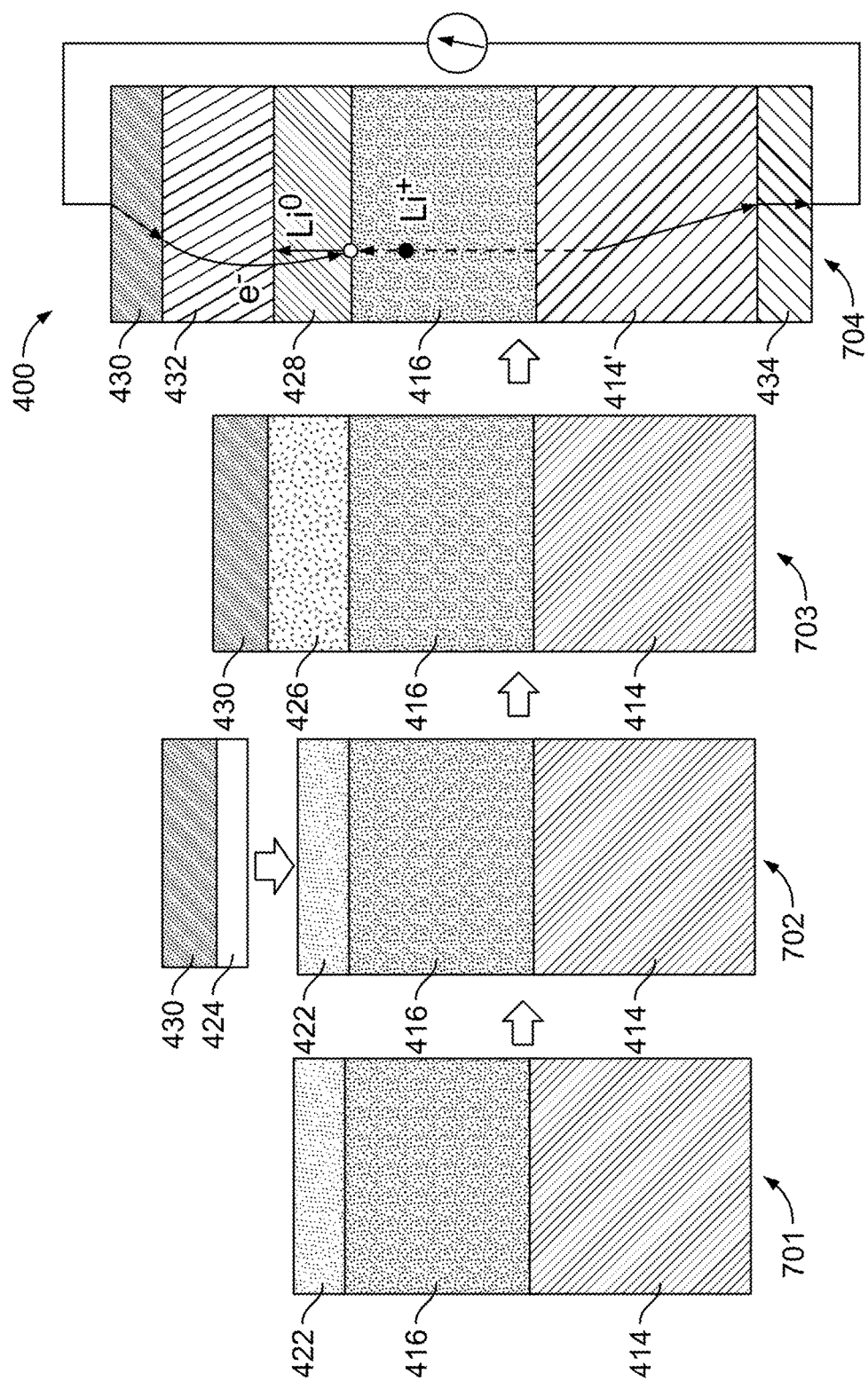

In the embodiment of FIG. 7, a sacrificial layer 422 is deposited onto the solid electrolyte 416 in step 701. The solid electrolyte 416 is applied onto a lithium-containing cathode 414. At step 702, an overcoat layer of a metal or metal alloy 424 is deposited onto an anode current collector 430. Alternatively, both the sacrificial layer 422 and the metal alloy 424 could be applied onto the solid electrolyte 416. At step 703, the sacrificial layer 422 and the metal alloy 424 react on contact and form a eutectic liquid metal interface layer 426. At step 704, operating potential is supplied to the battery 400 such that the battery starts charging. During charge, the cathode 414 is being de-lithiated and becomes a de-lithiated cathode 414'. Lithium from the cathode 414 is being deposited onto the solid electrolyte-eutectic liquid layer interface. The eutectic liquid metal interface layer 426 reacts with the incoming lithium to form a lithium-liquid metal alloy 428. Lithium is further being deposited onto the lithium-liquid metal alloy-electrolyte interface. The deposition of lithium forms a new layer, the lithium metal layer 432 between the lithium-liquid metal alloy 428 and the anode current collector 430. The de-lithiated cathode 414' is in contact with the cathode current collector 434.

Alternatively, at step 704, the eutectic liquid metal interface layer 426 may remain a liquid, without alloying with lithium ions, during the operating potential if the anode or anode current collector used has a higher lithium alloying potential or higher lithium intercalation potential than the alloying potential of the eutectic liquid metal interface layer 426. A non-limiting example may be an LTO anode (1.5V) and gallium liquid layer (<1 v) as the eutectic liquid metal interface layer 426. In the example, lithium ions from the cathode diffuse through the gallium liquid layer to the gallium liquid layer-anode current collector interface without alloying with the gallium liquid layer and intercalate with the LTO. The gallium liquid layer thus remains in liquid phase at the operating potential.

Figure 8:
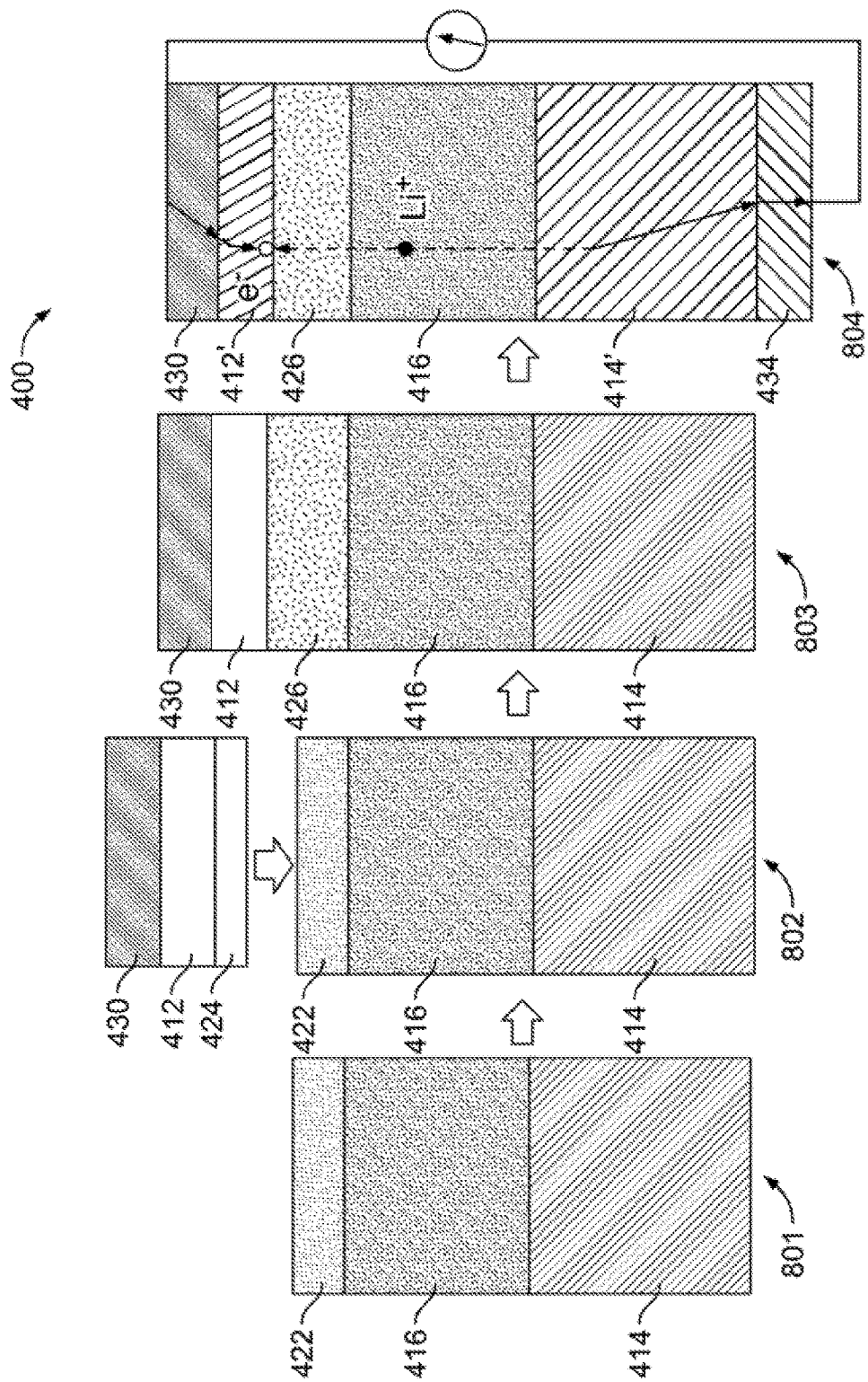

In an alternative embodiment of FIG. 8, a sacrificial layer 422 is deposited onto the solid electrolyte 416 in step 801. The solid electrolyte 416 is applied onto a lithium-containing cathode 414. At step 802, an overcoat layer of a metal or metal alloy 424 is deposited onto an anode 412 connected to an anode current collector 430. The anode 412 does not contain lithium prior to step 804. Alternatively, both the sacrificial layer 422 and the metal alloy 424 could be applied onto the solid electrolyte 416. At step 803, at or about room temperature, the sacrificial layer 422 and the metal alloy 424 react on contact and form a eutectic liquid metal interface layer 426. At step 804, operating potential is supplied to the battery 400. Lithium ions start migrating from the cathode 414 which is being de-lithiated and is depicted as a de-lithiated cathode 414'. Lithium ions from the cathode diffuse into the solid electrolyte 416 and the eutectic liquid metal layer 426 and intercalate with the anode 412, which becomes a lithium-containing anode 412'.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention. With respect to the figures, the dimensions within the figures are just illustrative.

What is claimed is:

1. A method of producing a solid state battery, the method comprising:
   pre-coating a solid electrolyte surface with a metal to form a sacrificial layer; and
   contacting a metal alloy with the sacrificial layer such that the sacrificial layer and the metal alloy react to form a eutectic liquid metal interface layer, at room temperature and between the electrolyte and a lithium anode, configured to alloy with the liquid metal interface layer at operating potential.

2. The method of claim 1, wherein the eutectic liquid metal interface layer is solid at operating potential.

3. The method of claim 1, wherein the eutectic liquid metal interface layer is galinstan or an alloy comprising gallium, tin, and indium.

4. The method of claim 1, wherein the metal to form the sacrificial layer is one of elements forming the liquid metal interface layer.

5. The method of claim 1, wherein the metal alloy is configured as a layer on a lithium metal anode.

6. The method of claim 1, wherein the solid electrolyte comprises lithium lanthanum zirconium oxide.

7. The method of claim 1, wherein the sacrificial layer is about 0.01 μm to 5 μm thick.

8. The method of claim 1, wherein the eutectic liquid metal interface layer is a liquid at or near room temperature when the sacrificial layer and the metal alloy are combined.

9. A method of wetting an alloy on a solid electrolyte comprising:
depositing a first solid metal or metal alloy onto a solid electrolyte surface or a lithium metal anode; and
contacting the first metal or metal alloy with a second solid metal or metal alloy such that the first solid metal or metal alloy and the second solid metal or metal alloy react to form a eutectic liquid metal interface layer, at room temperature and between the electrolyte and the lithium anode, configured to alloy with the eutectic liquid metal interface layer at operating potential.

10. The method of claim 9, wherein the first solid metal or metal alloy comprises at least one element of the eutectic liquid metal interface layer.

11. The method of claim 9, wherein the first metal alloy is configured as a top layer of the solid electrolyte surface.

12. The method of claim 9, wherein the second metal alloy is configured as a top layer of the solid electrolyte surface.

13. The method of claim 9, wherein the first and second metal alloys are both deposited onto the solid electrolyte surface.

14. The method of claim 9, wherein the solid electrolyte comprises lithium lanthanum zirconium oxide.

15. A method of forming a solid state battery comprising:
pre-coating a surface on a solid electrolyte, attached to a lithium-containing cathode, with a first metal or metal alloy to form a sacrificial layer;
depositing a second metal or metal alloy onto an anode or anode current collector;
contacting the second metal or metal alloy with the sacrificial layer such that the sacrificial layer and the second metal or metal alloy react to form a eutectic liquid metal interface layer, at room temperature, arranged between the solid electrolyte and the anode or anode current collector; and
de-lithiating the cathode by supplying operating potential to the battery such that lithium ions deposit on the eutectic liquid metal layer-anode interface or the eutectic liquid metal layer-anode current collector interface.

16. The method of claim 15 further comprising forming a lithium metal layer between the eutectic liquid metal interface layer and the anode current collector.

17. The method of claim 15, wherein the eutectic liquid metal interface layer alloys with lithium at operating potential.

18. The method of claim 15, wherein the eutectic liquid metal interface layer is liquid at operating potential.

19. The method of claim 15, wherein the first and second metal or metal alloys have different chemical composition.

20. The method of claim 15, wherein the first and second metal or metal alloys are solid at room temperature and liquefy on contact with each other.

* * * * *